US006626449B2

(12) United States Patent
Hazen (10) Patent No.: US 6,626,449 B2
(45) Date of Patent: Sep. 30, 2003

(54) DOUBLE-CASTERED WHEEL TRAILER HAVING LOCKABLE CASTER WHEELS (76) Inventor: Donald B. Hazen, P.O. Box 880, Highland City, FL (US) 33846

( * ) Notice: Subject to any disclaimer, the term of this patent is extended or adjusted under 35 U.S.C. 154(b) by 49 days.

(21) Appl. No.: 09/779,931

(22) Filed: Feb. 9, 2001

(65) Prior Publication Data
US 2002/0109333 A1 Aug. 15, 2002

(51) Int. Cl.[7] .................................................. B60D 1/42
(52) U.S. Cl. ..................... 280/492; 280/460.1; 280/494
(58) Field of Search .......................... 480/456.1, 460.1, 480/492–494

(56) References Cited

U.S. PATENT DOCUMENTS

| | | | | |
|---|---|---|---|---|
| 4,076,264 A | * | 2/1978 | Chatterley | 280/492 |
| 4,588,199 A | * | 5/1986 | Fisher | 280/204 |
| 4,664,403 A | * | 5/1987 | Livingston | 280/482 |
| 5,149,122 A | * | 9/1992 | Helber | 280/491.2 |
| 5,186,483 A | * | 2/1993 | Sheppard | 280/494 |
| 5,397,148 A | * | 3/1995 | Nelson | 280/416.1 |
| 5,520,404 A | * | 5/1996 | Schulte | 280/460.1 |
| 5,678,838 A | * | 10/1997 | Taylor | 280/413 |
| 5,909,887 A | * | 6/1999 | Hobrath | 280/32.7 |
| 6,168,182 B1 | * | 1/2001 | Ford | 280/494 |
| 6,273,447 B1 | * | 8/2001 | Vande Berg | 280/476.1 |
| 6,382,647 B1 | * | 5/2002 | Smith | 280/93.512 |
| 6,425,591 B1 | * | 7/2002 | Ball | 280/79.11 |

* cited by examiner

Primary Examiner—Lesley D. Morris
Assistant Examiner—Lee S. Lum
(74) Attorney, Agent, or Firm—George A. Bode; Lisa D. Velez; Bode & Associates (57) ABSTRACT A double-castered wheel trailer having a pair of lockable caster wheels. The lockable caster wheels are adapted to be locked for a trailing mode of operation and a backing mode of operation. The double-castered wheel trailer further includes a multi-planar adapting hitch-to-trailer coupler. The multi-planar adapting hitch-to-trailer includes a horizontal pivot member adapted to be secured to a pair of hitch balls and pivot in a horizontal plane about the towing vehicle. Further included is a vertical swivel member coupled to the horizontal pivot member and the trailer frame to independently rotate the trailer frame about said horizontal pivot member.

16 Claims, 6 Drawing Sheets

DOUBLE-CASTERED WHEEL TRAILER HAVING LOCKABLE CASTER WHEELS

BACKGROUND OF THE INVENTION

1. Field of the Invention

The present invention relates to trailers adapted to be towed behind a vehicle and, more particularly, to an double-castered wheel trailer with direction locking caster wheels having a trailing locked position and a backing locked position. The double-castered wheel trailer further includes a multi-planar pivoting coupler.

2. General Background

My single beam trailer described in U.S. Pat. No. 5,368,325, entitled "UNIVERSAL SINGLE-WHEEL SINGLE BEAM TRAILER HAVING ADJUSTABLE BED" discloses a trailer which includes a single beam frame structure having a single caster wheel. I have determined that for heavier loads double caster wheels are needed. Moreover, I have determined that enhanced control is needed to maneuver the trailer in the trailing and backing modes.

Several other apparatus have been patented which are aimed at trailers for use with towing vehicles.

U.S. Pat. No. 4,664,403, issued to Livingston, entitled "HITCH ADAPTER FOR DOUBLE CASTER WHEEL TRAILER" discloses a trailer hitch with double caster-type wheels. The trailer hitch structure further includes hitch couplers and a forward swivel coupled to the hitch of the towing vehicle.

U.S. Pat. No. 4,512,593, issued to Ehrhardt, entitled "TRACKING TRAILER CONSTRUCTION" discloses a pair of laterally spaced-apart dependingly supported caster wheel assemblies interconnected for equal and simultaneous rotation. The main frame includes a pair of laterally spaced apart hitch structures for hitching the trailer to the towing vehicle.

U.S. Pat. No. 3,033,593, issued to Zaha, entitled "AUTOMOTIVE TRAILER" discloses a trailer having a pair of caster wheels which are adapted to be locked during trailing operation and unlocked during the backing operation.

U.S. Pat. No. 2,475,174, issued to Boone, entitled "TRAILER" discloses a trailer which is adapted to be coupled to a towing vehicle and which includes a pair of caster wheels. The Boone patent provides a locking means for locking the caster wheels about their vertical axis and releasing the rigid connection between the vehicle and the trailer so that the trailer may track behind the vehicle.

U.S. Pat. No. 5,463,885, issued to Warren, Sr., entitled "TRAILER WHEEL LOCK" discloses a pair of cover plates and a chain assembly. The cover plates cover the outer surfaces of the wheels. The chain assembly extends between the cover plates and is adapted to be locked via a padlock or the like.

U.S. Pat. No. 5,372,018, issued to Smith, entitled "WHEEL LOCK" discloses a wheel lock using a slidably moving C-shaped brackets adapted to be received over the tire and rim of a wheel. The C-spaced brackets are moved closer around the wheel and are adapted to be locked together via a padlock or the like.

Other patents in the art include U.S. Pat. No. 4,305,602, issued to Ungvari et al., entitled "UTILITY TRAILER"; U.S. Pat. No. 5,839,745, on application to Cattau et al., entitled "LOCK MECHANISM FOR FIFTH WHEEL HITCH"; U.S. Pat. No. 5,301,527, issued to Pollard, entitled "SECURITY DEVICE FOR A TRAILER"; none of which meets the needs of the present invention.

SUMMARY OF THE PRESENT INVENTION

The preferred embodiment of the double-castered wheel trailer with direction locking caster wheels of the present invention solves the aforementioned problems in a straight forward and simple manner.

Broadly, the present invention contemplate a double-castered wheel trailer for attachment to a pair of hitch balls secured to a towing vehicle comprising: a trailer frame; a pair of wheel assemblies coupled to the trailer frame; and an adaptable hitch-to-trailer coupler having a horizontal pivot member adapted to be secured to the pair of hitch balls and pivot in a horizontal plane about the towing vehicle and a vertical swivel member coupled to the horizontal pivot member and the trailer frame to independently rotate the trailer frame about said horizontal pivot member.

Preferably, each wheel assembly of the present invention comprises: a caster wheel; a bracket coupled to the caster wheel and pivotally coupled to the trailer frame, the bracket includes a horizontal plate, a vertically-extending arm, and tabs positioned approximately 180 degrees from each other and having holes formed therein; and, a locking pin adapted to be received in a respective of the two holes to lock the caster wheel in one of a trailing mode or a backing mode.

The horizontal pivot member of the present invention comprises: a transverse cross bar; a first arm perpendicularly coupled to the transverse cross bar and having a free end; and a second arm perpendicularly coupled to the transverse cross bar and laterally spaced from the first arm and having a free end. The horizontal pivot member further includes a first ball socket member integrated with the free end of the first arm; and, a second ball socket member integrated with the free end of the second arm.

The vertical pivot member of the present invention comprises a spindle rotatably coupled perpendicularly to the transverse cross bar and fixedly coupled to the trailer frame wherein the trailer frame is adapted to independently rotate with respect the transverse cross bar.

In view of the above objects, it is a feature of the present invention to provide a double-castered wheel trailer with direction locking caster wheels which is relatively simple structurally and thus simple to manufacture.

Another feature of the present invention is to provide a double-castered wheel trailer with direction locking caster wheels which is relatively simple to install or hitch to a towing vehicle.

The above and other objects and features of the present invention will become apparent from the drawings, the description given herein, and the appended claims.

BRIEF DESCRIPTION OF THE DRAWING

For a further understanding of the nature and objects of the present invention, reference should be had to the following description taken in conjunction with the accompanying drawings in which like parts are given like reference numerals and, wherein:

FIG. 7 illustrates a perspective view of the adaptable hitch-to-trailer coupler of the present invention;

FIG. 9 illustrates an top view of the lockable caster wheel assembly in the trailing position; and, FIG. 10 illustrates an top view of the lockable caster wheel assembly with the wheel being pivoted toward the backing position.

DETAILED DESCRIPTION OF THE PREFERRED EMBODIMENT

Figure 1:
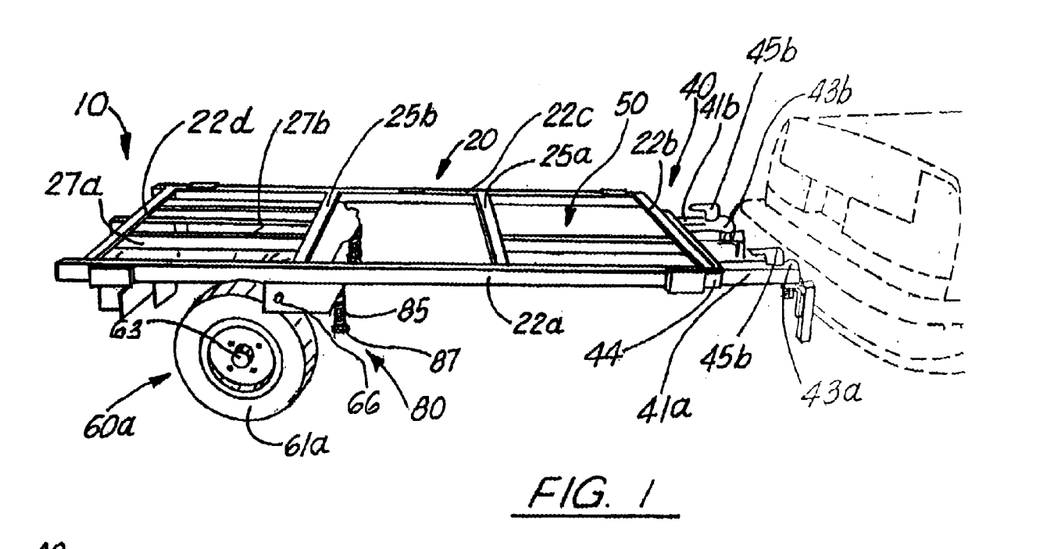
FIG. 1 illustrates a perspective view of the double-castered wheel trailer with direction locking caster wheels of the preferred embodiment of the present invention hitched to a vehicle (shown in phantom)
Figure 2:
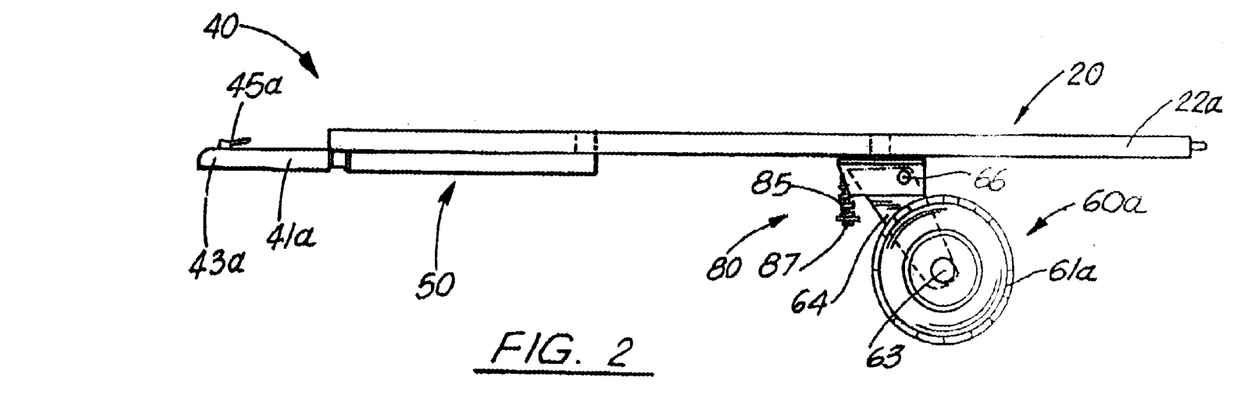
FIG. 2 illustrates a side view of the double-castered wheel trailer with direction locking caster wheels of the present invention.
Figure 3:
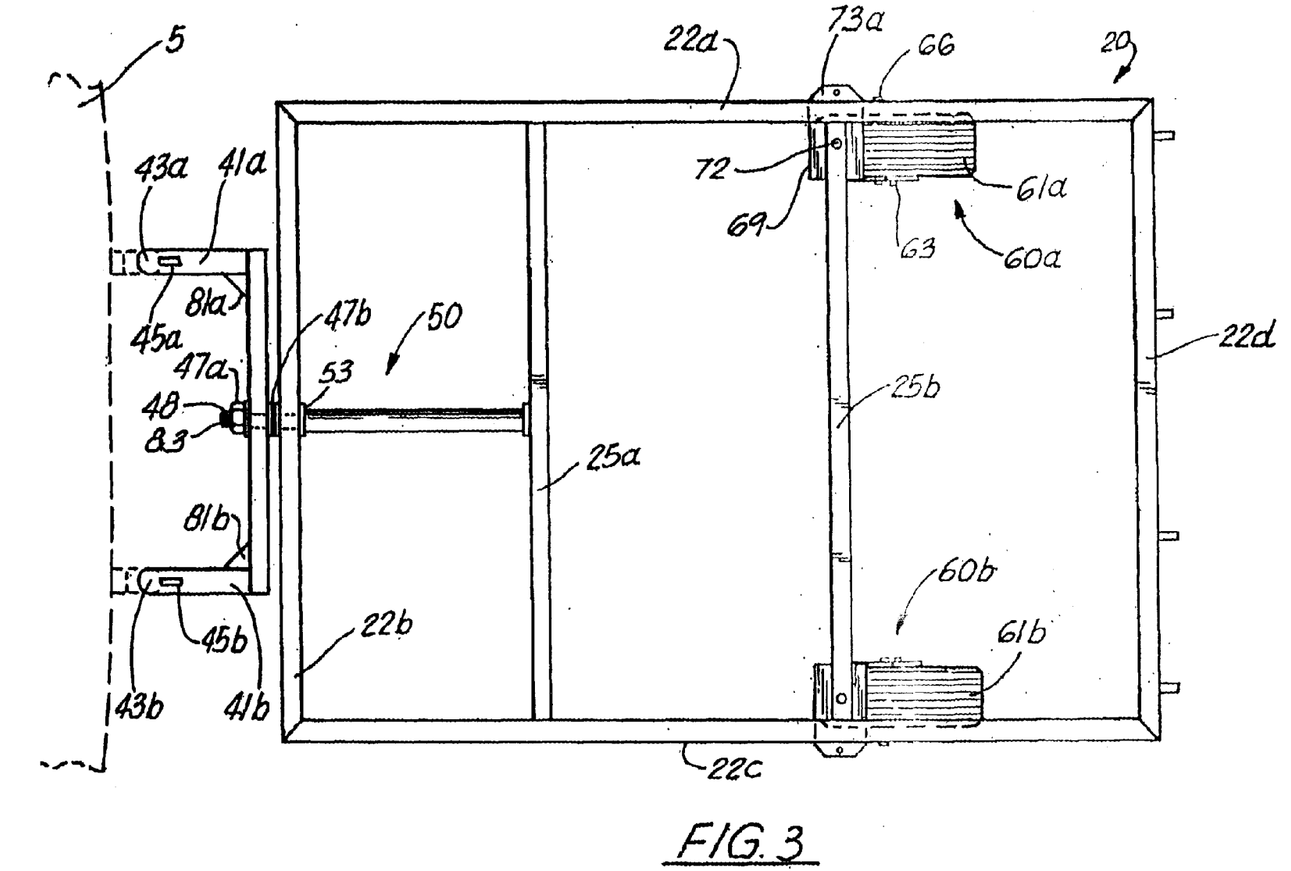
FIG. 3 illustrates a top view of the double-castered wheel trailer with direction locking caster wheels of the present invention.

Referring now to the drawings and in particular FIGS. 1–3, the double-castered wheel trailer of the present invention is generally referenced by the numeral 10. The double-castered wheel trailer 10 of the present invention includes a trailer frame 20, an adaptable hitch-to-trailer coupler 40 and two wheel assemblies 60a and 60b each of which includes a direction locking caster wheel 61a, 61b.

The trailer frame 20 includes a plurality of beams 22a, 22b, 22c and 22d welded together to from a square or rectangular frame structure having four corners. The trailer frame 20 further includes cross-beams 25a and 25b coupled perpendicular to the parallel beams 22a and 22c. In the preferred embodiment, the trailer frame 20 includes rear-trailer support bars 27a and 27b.

Referring now to FIGS. 3–7, the trailer frame 20 is coupled to a vehicle 5 via an adaptable hitch-to-trailer coupler 40. The adaptable hitch-to-trailer coupler 40 includes multiple degrees of maneuvering adaptability. As will be seen more clearly from the description below, the adaptable hitch-to-trailer coupler 40 provides for independent and secure horizontal and vertical pivoting. The horizontal-plane pivot member 41 include laterally spaced hitch couplers 43a and 43b which are capable of pivoting about an axis A1 (FIG. 5) essentially perpendicular to the horizontal plane or ground. The vertical-plane pivot member 50 includes a swivel coupler or spindle 52 rotatably coupled to the horizontal-plane pivot member 41 and affixed to the trailer frame 20.

Figures 7, 9, 10:
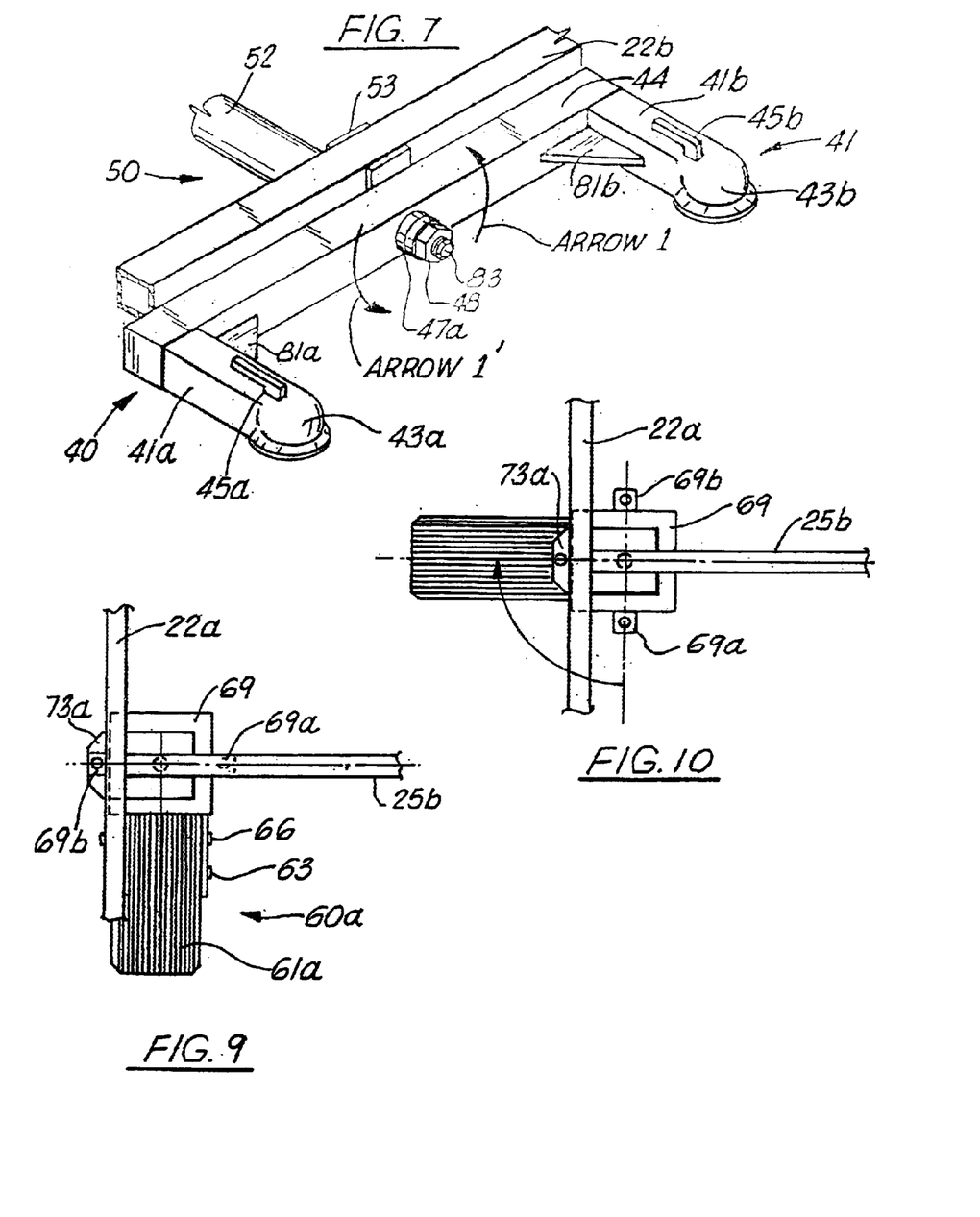

During operation the horizontal-plane pivot member 41 allows the trailer 10 to pivot with respect to the rear of the vehicle 5 such as the result of turning a corner. Independent of the horizontal-plane pivot member 41, the vertical-plane pivot member 50 is designed to pivot about the horizontal-plane pivot member 41 or axis A2, as best seen in FIG. 7 in the direction of ARROWS 1 and 1'. Thus, the vertical-plane pivot member 50 allows the caster wheels 61a and 61b to adapt to an uneven road or surface thereby the caster wheels 61a and 61b remain in rolling engagement with the uneven road or surface.

Figure 6:
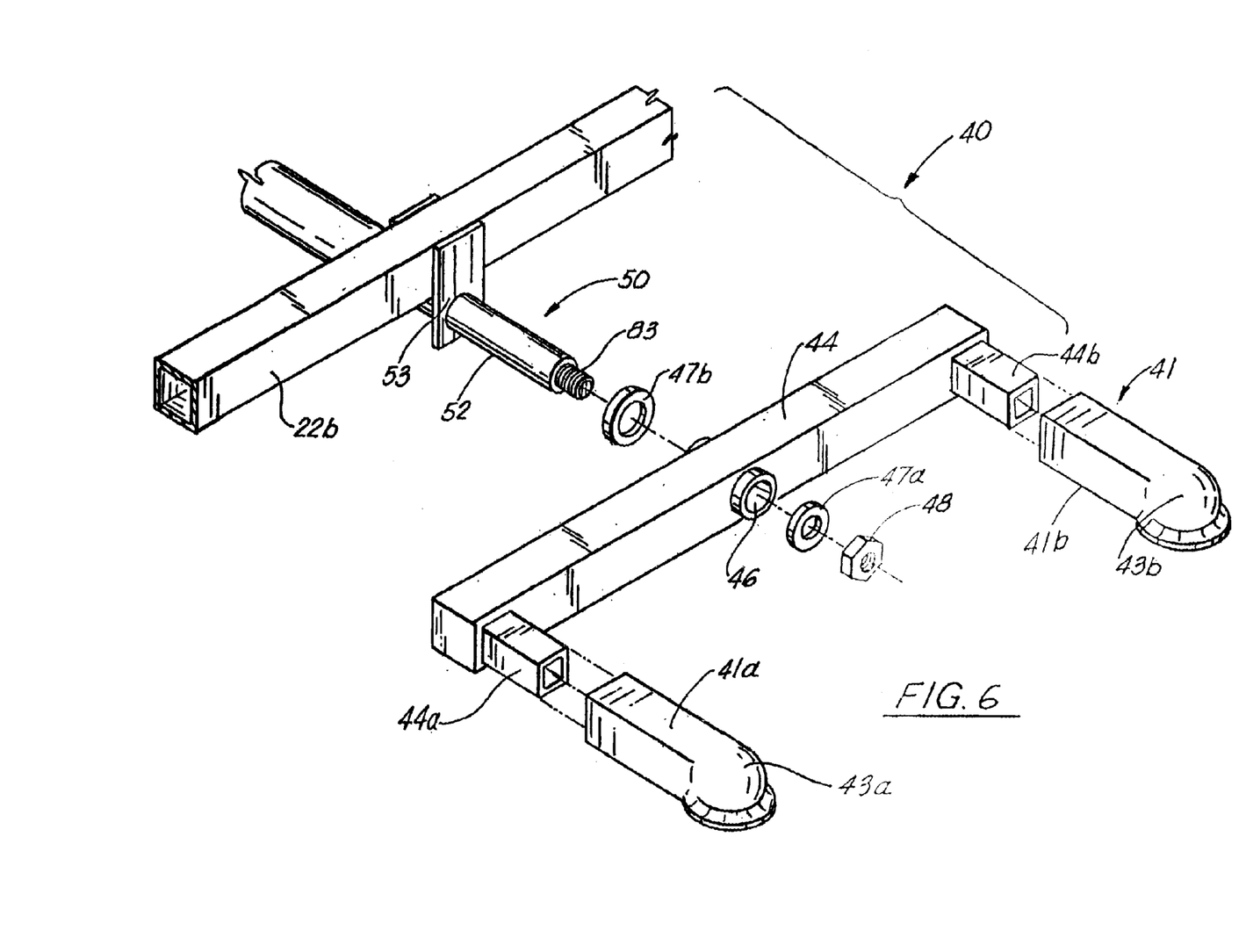
FIG. 6 illustrates an exploded view of the adaptable hitch-to-trailer coupler of the present invention.

Referring now to FIG. 6, an exploded view of the adaptable hitch-to-trailer coupler 40 is shown wherein the manual locking devices or levers 45a and 45b and the corner frame supports 81a and 81b have been omitted from illustration. The horizontal-plane pivot member 41 includes transverse cross bar 44 and two parallel arms 41a and 41b coupled perpendicularly to the distal ends of the transverse cross bar 44. The free-ends of the parallel arms 41a and 41b have integrated therewith hitch coupler 43a and 43b, respectively. The hitch couplers 43a and 43b include manual locking devices or levers 45a and 45b, respectively.

Figure 4:
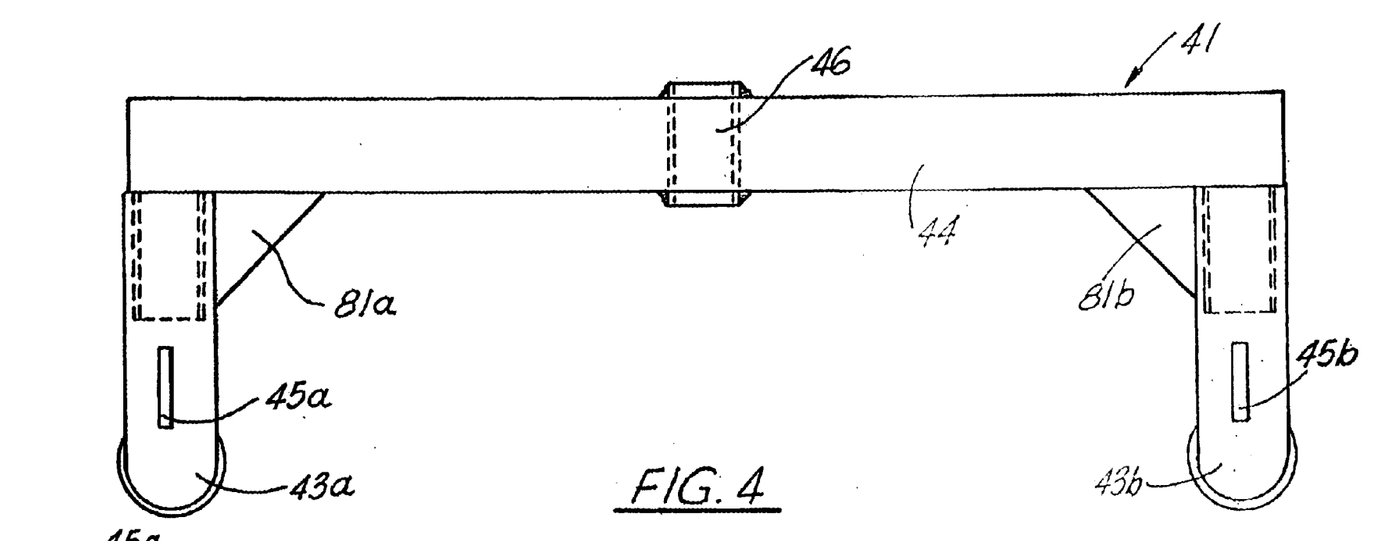
FIG. 4 illustrates a top view of the hitch assembly of the present invention.

In the preferred embodiment, the parallel arms 41a and 41b are coupled to the transverse cross bar 44 via a mating connection. The parallel arms 41a and 41b are hollow and receive therein mated male extensions 44a and 44b, respectively. Corner frame supports 81a and 81b are provided, as best seen in FIGS. 3, 4 and 7. The corner frame supports 81a and 81b are coupled to the transverse cross bar 44 and to the parallel arms 41a and 41b.

Figure 5:
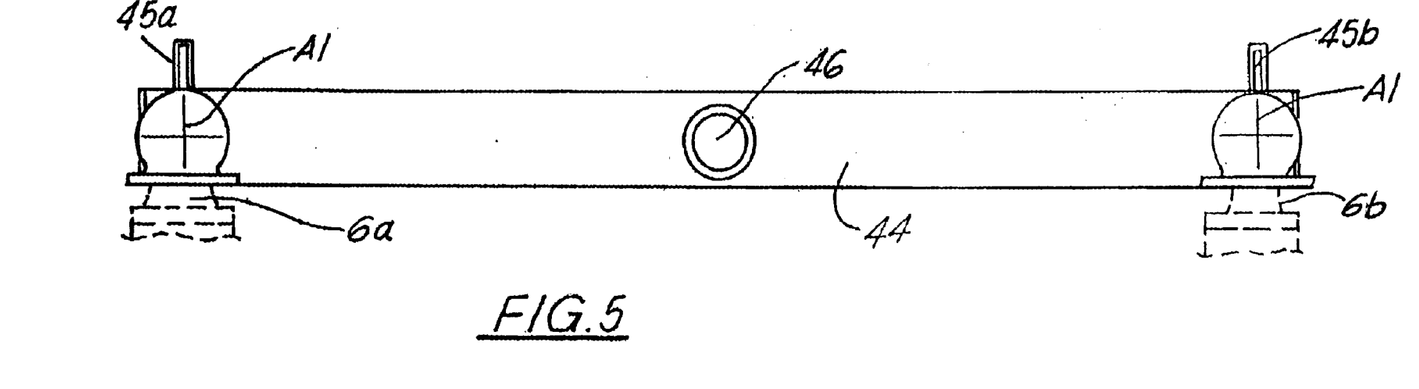
FIG. 5 illustrates an end view of the hitch assembly of the present invention.

In the exemplary embodiment, the vehicle 5 is equipped with two hitch balls 6a and 6b, as best seen in FIG. 5, mounted to the rear of the vehicle 5 in a known manner. The hitch couplers 43a and 43b are spaced apart hitch-ball sockets which are spaced the same distance as the hitch balls 6a and 6b of the vehicle 5 via the length of the transverse cross bar 44.

The swivel coupler or spindle 52 of the vertical-plane pivot member 50 is supported by bracket 53 coupled by welding to the front beam 22b of the trailer frame 20. A rear free end of the swivel coupler or spindle 52 is affixed to the cross beam 25a. The front free end 83 of the swivel coupler or spindle 52 is threaded and is rotatably coupled to the transverse cross bar 44 of the horizontal-plane pivot member 41. Hence, the horizontal-plane pivot member 41 remains oriented in the preferred horizontal plane as the trailer automatically orients or adapts to the topography of the ground. In other words, the trailer's ability to automatically orient or adapt to the topography of the ground allows one side of the trailer to be elevated or offset in the vertical plane with respect to the other side so that the wheels 61a and 61b remain in contact with uneven ground.

The front free end of the swivel coupler or spindle 52 includes a threaded end having a reduced diameter. The reduced diameter is received in through hole 46 and secured therein via washers 47a and 47b and nut 48. In the exemplary embodiment, the length of the swivel coupler or spindle 52 extends from the transverse cross bar 44 of the horizontal-plane pivot member 41 to the front cross bar 25a of the trailer frame 20.

Figure 8:
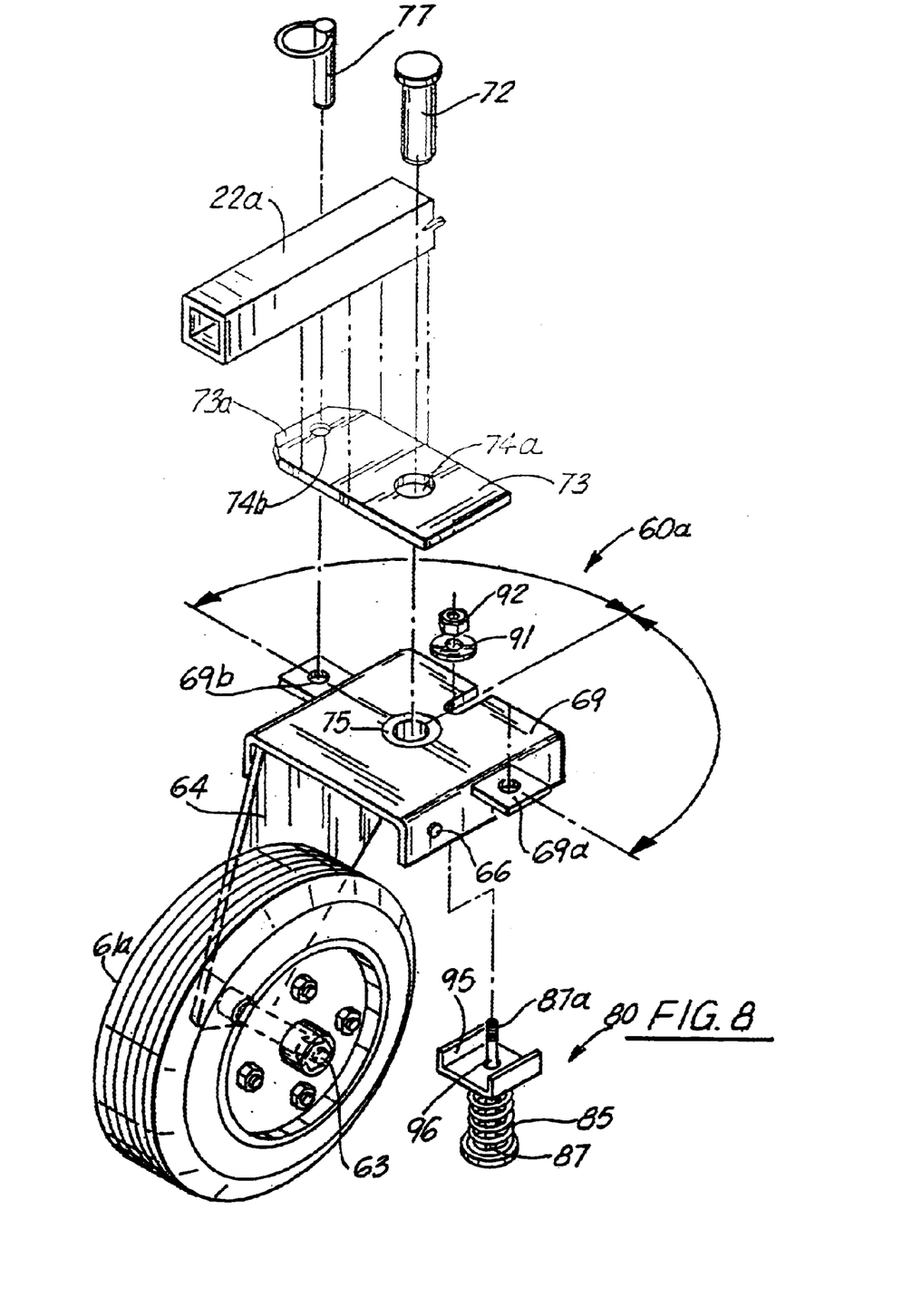
FIG. 8 illustrates an exploded view of the lockable caster wheel assembly.

Since both of the wheel assemblies 60a and 60b are essentially identical, only one such wheel assembly will be described in detail. Referring now to FIG. 8, the details of the wheel assembly 60a are shown. The wheel assembly 60a includes a free caster wheel 61a adapted to rotate about axle 63. The axle 63 is supported by arm 64 attached to the trailer frame 20 by a horizontal pivoting plate 69. The top of the arm 64 is supported by a horizontal pivot or spindle 66.

The wheel assembly 60a further include central kingpin 72 which is received in the Nylon washer 75. The Nylon washer 75 serves to dampen the caster action and to prevent shimmy of the wheel assembly 60a. The wheel assembly 60a trails the kingpin 72 during the forward travel of the trailer 10. Thus, the weight of a load on the trailer frame 20 serves to maintain the wheel assembly 60a in a trailing relationship relative to the direction of movement of the trailer 10. When the vehicle 5 is backing, the wheel assembly 60a will caster about the kingpin 72.

The trailer frame 20 has affixed to the side beam 22a and aligned with the cross bar 25b a locking plate 73. The locking plate 73 includes a center hole 74a for receiving kingpin 72. The exterior side of the locking plate 73 includes an tab portion 73a having a locking hole 74b formed therein. The center axis of the center hole 74a and the center axis of the locking hole 74b are essentially aligned and parallel.

The horizontal pivoting plate 69 includes two locking tabs 69a and 69b projecting from the side of the plate 69 and spaced approximately 180 degrees apart. The locking tabs 69a and 69b have center holes formed therein. When the wheel 61a is in a trailing position (FIGS. 1 and 2), the hole 74b in the locking plate 73 would align with the hole in the locking tab 69a. The wheel 61a is locked with the receipt of locking pin 77 in the trailing position. When the wheel 61a is in a backing position (FIGS. 8 and 9), the the hole 74b in the locking plate 73 would align with the hole in the locking tab 69b. The wheel 61a is locked with the receipt of locking pin 77 in the backing position.

Referring also to FIG. 10, the wheel 61a is designed to pivot about kingpin 72 between the backing position and the trailing position.

The wheel assembly 60a includes shock absorber 80. The shock absorber 80 includes a vertical coil spring 85 and an essentially vertical retainer rod 87 having a threaded end 87a which is attached to a horizontal plate 69 at groove 89 via washer 91 and bolt 92.

The shock absorber 80 further includes a U-shaped brace 95 having hole 96 for the receipt of the retainer rod 87. The upward projecting surfaces of the U-shaped brace 95 abut the under side of the horizontal plate 69. The vertical coil spring 85 is disposed between the underside of the U-shaped brace 95 and the lower end of the retainer rod 87. In operation, the shock absorber absorbs imparting forces as the result of the arm 64 pivoting about pivot 69.

Because many varying and differing embodiments may be made within the scope of the inventive concept herein taught and because many modifications may be made in the embodiment herein detailed in accordance with the descriptive requirement of the law, it is to be understood that the details herein are to be interpreted as illustrative and not in a limiting sense.

What is claimed as invention is:

1. A double-castered wheel trailer f or attachment to a pair of hitch balls secured to a towing vehicle comprising:
   (a) a trailer frame;
   (b) a pair of wheel assemblies coupled to the trailer frame, wherein each wheel assembly comprises:
       a caster wheel;
       a bracket coupled to said caster wheel and pivotally coupled to said trailer frame, said bracket includes a horizontal plate, a vertically-extending arm, and tabs positioned approximately 180 degrees from each other and having holes formed therein; and,
       a locking pin adapted to be received in a respective of the two holes to lock the caster wheel in one of a trailing mode or a backing mode; and
   (c) an adaptable hitch-to-trailer coupler having a horizontal pivot member adapted to be secured to the pair of hitch balls and pivot in a horizontal plane about said towing vehicle and a vertical swivel member coupled to said horizontal pivot member and said trailer frame to independently rotate said trailer frame about said horizontal pivot member.

2. The trailer of claim 1, wherein each wheel assembly comprises: a shock absorber.

3. The trailer of claim 1, wherein said horizontal pivot member comprises:
   a transverse cross bar;
   a first arm perpendicularly coupled to the transverse cross bar and having a free end;
   a second arm perpendicularly coupled to the transverse cross bar and laterally spaced from the first arm and having a free end;
   a first ball socket member integrated with the free end of the first arm; and,
   a second ball socket member integrated with the free end of the second arm.

4. The trailer of claim 3, wherein the first ball socket member and the second ball socket member each include a means for manually locking.

5. The trailer of claim 3, wherein the vertical pivot member comprises a spindle rotatably coupled perpendicularly to said transverse cross bar and fixedly coupled to said trailer frame.

6. The trailer of claim 5, wherein said trailer frame comprises:
   an outer frame structure having four side bars joined together to form four corners; and
   a plurality of spaced cross bars perpendicular to the longitudinal axis of said trailer frame wherein said spindle is affixed to one of the spaced cross bars.

7. The trailer of claim 6, wherein said wheel assemblies are coupled to another of the spaced cross bars.

8. A trailer for attachment to a towing vehicle comprising:
   (a) means for supporting a load;
   (b) means for rolling the load supporting means, said rolling means comprising a pair of wheel assemblies, wherein each wheel assembly comprises:
       a caster wheel;
       a bracket coupled to said caster wheel and pivotally coupled to said load support means, said bracket includes a horizontal plate, a vertically-extending arm, and tabs positioned approximately 180 degrees from each other and having holes formed therein; and,
       a locking pin adapted to be received in a respective of the two holes to lock the caster wheel in one of a trailing mode or a backing mode; and
   (c) means for securing the load supporting means to the towing vehicle, said securing means comprising:
       (i) means, adapted to be directly coupled to said towing vehicle, for pivoting about a horizontal plane the load supporting means, and
       (ii) means, directly coupled to said pivoting means and said load supporting means, for independently swiveling in a vertical plane the load supporting means about said pivoting means.

9. The trailer of claim 8, wherein each wheel assembly comprises: means for absorbing shock.

10. The trailer of claim 8, wherein said pivot means includes:
    a transverse cross bar;
    a first arm perpendicularly coupled to the transverse cross bar and having a free end;
    a second arm perpendicularly coupled to the transverse cross bar and laterally spaced from the first arm and having a free end;
    a first ball socket member integrated with the free end of the first arm; and,
    a second ball socket member integrated with the free end of the second arm.

11. The trailer of claim 10, wherein the first ball socket member and the second ball socket member each include a manual locking device.

12. The trailer of claim 10, wherein the swiveling means includes: a spindle rotatably coupled perpendicularly to said transverse cross bar and fixedly coupled to said trailer frame.

13. The trailer of claim 12, wherein said load supporting means comprises:
an outer frame structure having four side bars joined together to form four corners; and
a plurality of spaced cross bars perpendicular to the longitudinal axis of said load supporting means wherein said spindle is affixed to one of the spaced cross bars.

14. The trailer of claim 13, wherein said wheel assemblies are coupled to another of the spaced cross bars.

15. A trailer for attachment to a pair of hitch balls secured to a towing vehicle comprising:
(a) a trailer frame;
(b) a pair of wheel assemblies coupled to the trailer frame wherein each wheel assembly comprises:
  (i) a caster wheel,
  (ii) a bracket coupled to said caster wheel and pivotally coupled to said trailer frame, said bracket includes a horizontal plate, a vertically-extending arm, and tabs positioned approximately 180 degrees from each other and having holes formed therein, and
  (iii) a locking pin adapted to be received in a respective of the two holes to lock the caster wheel in one of a trailing mode or a backing mode; and
(c) an adaptable hitch-to-trailer coupler having a horizontal pivot member adapted to be secured to the pair of hitch balls and pivot in a horizontal plane about said towing vehicle and a vertical swivel member coupled to said horizontal pivot member and said trailer frame to independently rotate said trailer frame about said horizontal pivot member, said horizontal pivot member comprising:
a transverse cross bar;
a first arm perpendicularly coupled to the transverse cross bar and having a free end;
a second arm perpendicularly coupled to the transverse cross bar and laterally spaced from the first arm and having a free end;
a first ball socket member integrated with the free end of the first arm; and,
a second ball socket member integrated with the free end of the second arm.

16. The trailer of claim 15, wherein the vertical pivot member comprises a spindle rotatably coupled perpendicularly to said transverse cross bar and fixedly coupled to said trailer frame.

* * * * *